United States Patent Office 2,860,521
Patented Nov. 18, 1958

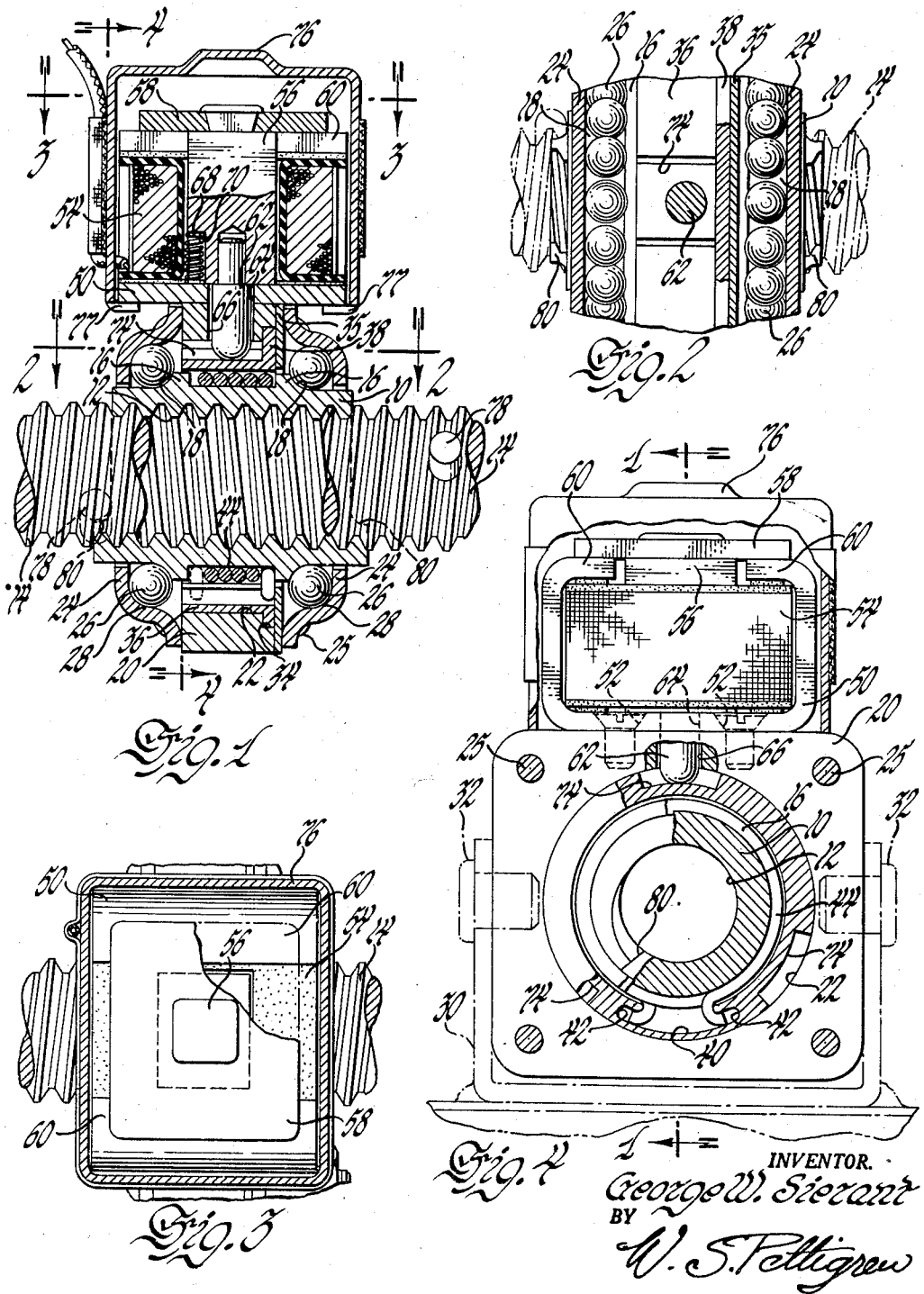

2,860,521

MECHANICAL MOVEMENT DEVICE

George W. Sierant, Detroit, Mich., assignor to General Motors Corporation, Detroit, Mich., a corporation of Delaware Application February 18, 1957, Serial No. 640,766

10 Claims. (Cl. 74—424.8)

This invention relates to mechanical movement devices and more particularly to screw and nut actuators.

The screw and nut actuator of this invention is of the type including a helically threaded lead screw and a nut threadedly receiving the lead screw and selectively brakeable to a non-rotatable member so as to prevent the nut from rotating with the lead screw and thereby cause the nut to move axially along the lead screw upon rotational movement thereof. The nut may be secured to a member in order to operate this member upon axial movement of the nut along the lead screw. Screw and nut actuators of this type have many uses and are often used in power operated vehicle seat adjuster structures.

In many present actuators, the nut is rotatably received within a non-rotatable housing and a power operated plunger supported by the housing is selectively operable to impositively engage an axial slot in the nut and thereby brake the nut to the housing so that the nut will move along the lead screw upon rotational movement thereof. However, the nut may encounter an obstruction or a torque overload which will prevent axial movement of the nut and cause the nut to rotate with the lead screw. This will continuously cam the plunger out of engagement with the slot in the nut until the power operated plunger is retracted and will result in undue wear of the nut and objectionable noisy operation.

The screw and nut actuator of this invention operates in a very smooth and quiet manner and no noise or undue wear of the nut results when the nut encounters a torque overload or an obstruction. In its preferred embodiment, the nut and non-rotatable housing rotatably supporting the nut are operatively interconnected by two separate brakes rather than by a single brake. One of the brakes is of the selectively operable positive type wherein a power operated plunger is movable into and out of engagement with one of a plurality of axial slots in an intermediate braking member which is rotatably supported on the housing between the housing and the nut. The intermediate braking member in turn is braked to the nut by an impositive type brake. The brake includes a helically wound torsion spring which grippingly engages the nut with a predetermined friction force and is in turn secured to the braking member so as to interconnect the nut and braking member for simultaneous rotational movement within predetermined torque limits. Thus, whenever the nut encounters a torque overload or an obstruction during axial movement thereof, the nut will slip relative to the spring to allow the nut to rotate with the lead screw without releasing the positive type brake. The positive type brake may be operated at the will of the operator to cooperate with the impositive type brake in releasably securing the nut to the non-rotatable housing to cause the nut to move axially along the lead screw upon rotation thereof.

The primary object of this invention is to provide an improved screw and nut actuator. Another object of this invention is to provide an improved screw and nut actuator operable in a smooth and quiet manner regardless of the torque overload or obstruction encountered by the nut. A further object of this invention is to provide an improved screw and nut actuator wherein the nut is selectively braked by positive and impositive type brakes so as to be movable axially relative to a rotatable lead screw. Yet, another object of this invention is to provide improved screw and nut actuator which includes a positive type brake and an impositive type brake cooperatively braking the nut to provide for axial movement of the nut along a rotatable lead screw, with the impositive type brake being releasable independently of the positive type brake upon the nut encountering a torque overload or obstruction to thereby release the nut against rotation and allow the nut to rotate with the lead screw without causing undue wear or objectionable noise.

These and other objects of this invention will be readily apparent from the following specification and drawing, in which:

Figure 1 is a partial axial sectional view of a screw and nut actuator according to this invention;

Figure 2 is a partial sectional view taken along the plane indicated by line 2—2 of Figure 1;

Figure 3 is a partial sectional view taken along the plane indicated by line 3—3 of Figure 1; and Figure 4 is an axial view of the screw and nut actuator with parts thereof broken away for clarity of illustration indicated by line 4—4 of Figure 1.

Referring now to the drawings, a nut 10 includes a helically threaded bore 12 which receives a helically threaded bore 12 which receives a helically threaded lead screw 14 to mechanically interconnect the nut and lead screw by means of friction. It is intended that the lead screw 14 be rotatably supported adjacent either end thereof and be driven by suitable power operating means such as an electric motor. The nut 10 includes a pair of spaced peripheral flanges 16 which are provided with continuous arcuate grooves 18 to one side thereof. A housing 20 having a bore 22 surrounds nut 10 and is provided at either side thereof with a circular cover 24 which is secured to the housing at 25. A plurality of ball bearings 26 are positioned between the grooves 18 of the flanges 16 and a continuous annular groove 28 in each of the covers to rotatably support the nut within the housing 20.

The housing 20 is non-rotatable and may either be stationary or be moved axially with respect to the screw 14 upon relative rotational movement between the nut and lead screw as will be described. If the lead screw 14 is stationary although rotatable, the nut 10 will move axially along the lead screw and the housing 20 may then be connected in a suitable manner to a member to be operated so that movement of the housing and nut axially along the lead screw 14 upon rotational movement of the lead screw will operate the member to be operated. As shown schematically in Figure 4, the housing 20 may be mounted in a fixed support 30 by means of trunnions 32 which rotatably interconnect the nut and support so that the nut and lead screw may tilt relative thereto. In such an arrangement as this, the lead screw 14 will move axially relative to the nut if the nut is held against rotation upon rotational movement of the lead screw.

Referring now particularly to Figures 1 and 4 of the drawings, the manner in which the nut is held against rotation will be described. The annular bore 22 of the housing 20 is provided with an outwardly opening peripheral groove 34 at one side thereof, with a shim or washer 35 being positioned between this side of the housing and the adjacent cover 24 so as to close the open side of the groove. A brake ring 36 is rotatably mounted within the annular bore 22 of housing 20 and includes an annular peripheral flange 38 at one side thereof which is received within the groove 34 in order to interlock the brake ring and the housing so as to prevent axial movement therebetween but allow rotary movement therebetween. As may be seen particularly in Figure 4 of the drawings, the brake ring 36 is provided with an axial slot 40 having opposite undercut grooves 42. A continuous wound torsion spring 44 surrounds the nut 10 intermediate the peripheral flanges 16 thereof, with the opposite ends of the spring being hooked into the spaced grooves 42 of slot 40 at each end of the nut. The spring 44 is wound around the nut so as to grip the nut with a predetermined friction force so that the spring will grip the nut within predetermined torque limits but will allow the nut to slip relative to the spring upon a torque overload greater than the predetermined torque limits. Thus, the nut 10 will always rotate with the brake ring 36 unless the torque overload which is placed on the nut is greater than the friction force exerted by the spring on the nut whereupon the nut will slip relative to the spring and will rotate independently of the clutch ring 36.

Referring now to Figure 4 of the drawings, a generally U-shaped bracket 50 is secured to the upper wall of housing 20 by a pair of spaced countersunk screws 52. A solenoid core 54 fits within bracket 50 and receives a solenoid armature 56. The armature 56 is provided with a flat head 58 which is engageable with the opposing inwardly extending portions 60 of bracket 50 in order to limit inward movement of the armature with respect to the solenoid coil upon energization of the coil. Armature 56 is further provided with a plunger 62 which is secured thereto in a suitable manner and extends through aligned bores 64 in the lower wall of bracket 50 and 66 in the upper wall of housing 20. Upon energization of the solenoid coil, the plunger 62 will be moved inwardly of the aligned bores 64 and 66 so that the plunger will extend within the annular bore 22 of the housing 20.

In order to move the armature outward upon deenergization of the coil, a spring 68 fits within a bore 70 in the armature and has its opposite ends engaging a shoulder of the bore and the lower wall of the bracket 50. Upon energization of the coil 54 to move the armature 56 inwardly, the spring is compressed to thereby move the armature outward upon deenergization of the coil.

Referring now particularly to Figure 4 of the drawing, the brake ring 36 is provided with three circumferentially spaced axial slots 74 which open to the outer periphery of the brake ring to the surface of the bore 22 of housing 20. As may be seen, the plunger 62 may fit within any one of the slots 74 upon energization of the solenoid coil 54 so as to positively brake the brake ring 36 to the housing 20. In order to cover the solenoid coil 54 and the armature 56 and to protect them against dust and dirt, a cover 76 is provided to fit over the bracket 50 with the cover being secured in place by a number of tabs 77 which are bent into engagement with the lower wall of the bracket.

The nut is shown in an operative position in Figures 1 and 4 of the drawing. Thus, the coil 54 is energized so that the armature 56 has moved inwardly within the coil and the plunger 62 has moved into engagement with one of the slots 74 of the brake ring to brake the brake ring to the housing and prevent rotational movement thereof. In turn, the brake ring 36 is braked to the nut 10 by means of spring 44 so that the nut 10 is held against rotation. Thus, if the lead screw 14 rotates, the nut will move axially along the lead screw in either direction depending upon the direction of rotation thereof. However, if the nut encounters a torque overload which is greater than the friction force of the spring, the nut 10 will slip relative to the spring and will rotate with the lead screw even though the coil 54 has not been deenergized so as to retract the plunger 62 out of engagement with the particular slot 74. Thus, the screw and nut actuator will operate in a smooth and quiet manner regardless of whether the nut is moving axially along the lead screw or whether the nut has encountered a torque overload which prevents axial movement thereof along the lead screw.

Referring now particularly to Figure 1 of the drawing, it will be noted that the lead screw 14 includes a pair of spaced pins 78 which are positioned on either side of the nut 10. It will further be noted that the nut 10 includes a shoulder 80 at either side thereof which is engageable with one of the spaced pins 78 so as to limit the axial travel of the nut along the lead screw in either direction as will now be described. When the nut has moved along the lead screw in either direction so that one of the shoulders 80 has engaged one of the pins 78, the nut will be braked to the lead screw for simultaneous rotational movement therewith. Since the nut cannot move axially of the lead screw in the same direction as it was previously moving, the torque overload caused by engagement of the particular shoulder 80 with the particular pin 78 causes the nut to slip relative to the spring as previously described so that the nut will rotate in place without any undue wear or noise.

Whenever it is desired to have the nut rotate in place when the lead screw is rotating or to release the nut against rotation, the coil 54 is deenergized to retract the plunger 62 out of engagement with the particular slot 74 so that the nut 10 and brake ring 36 will rotate with the lead screw or will be stationary.

As previously mentioned, the screw and nut actuator of this invention is equally applicable to operations wherein the screw 14 moves axially and the nut 10 is stationary although rotatable. In such instances, the member to be operated may be connected in a suitable manner to the lead screw so that axial movement of the lead screw relative to the nut will operate the member. In such installations, a torque overload placed upon the lead screw will not operate to disengage the nut 10 from the brake ring 36. However, whenever one of the pins 78 moves into engagement with one of the shoulders 80 of the nut, the nut will rotate with the lead screw to stop axial movement of the lead screw relative thereto so that the nut and lead screw will rotate in place.

Thus, this invention provides an improved screw and nut actuator which includes a positive brake and an impositive brake cooperatively interconnecting the nut and a non-rotatable member so as to selectively brake the nut against rotation to allow relative axial movement between the nut and lead screw upon rotation of the lead screw. The positive type brake allows selective braking of the nut at the will of the operator while the impositive type brake provides for release of the nut against rotation should the nut encounter an obstruction or a torque overload. Even though the nut should encounter an obstruction or a torque overload, it will not be subject to undue wear nor will the screw and nut actuator produce objectionable noise.

I claim:

1. A mechanical movement device comprising, a rotatable lead screw, a nut threadedly receiving said lead screw, a non-rotatable member, a braking member rotatably supported on said non-rotatable member, first braking means operatively secured to said braking member and grippingly engageable with said nut within predetermined torque limits to secure said nut to said braking member for simultaneous rotational movement therewith within said predetermined torque limits, and second braking means operatively interconnecting said non-rotatable member and said braking member to secure said braking member to said non-rotatable member whereby said first and second braking means cooperatively secure said nut against rotation for axial movement along said lead screw upon relative rotational movement therebetween.

2. A mechanical movement device comprising, a rotatable lead screw, a nut threadedly receiving said lead screw, a non-rotatable member, a braking member rotatably supported on said non-rotatable member, first braking means operatively secured to said braking member and grippingly engageable with said nut within predetermined torque limits to secure said nut to said braking member for simultaneous rotational movement therewith within said predetermined torque limits, second braking means operatively interconnecting said non-rotatable member and said braking member to secure said braking member to said non-rotatable member whereby said first and second braking means cooperatively secure said nut against rotation for axial movement along said lead screw upon relatively rotational movement therebetween, and means on said lead screw engageable by said nut within predetermined limits of axial travel therealong to brake said nut to said lead screw and thereby apply a torque overload sufficient to disengage said first braking means and thereby allow said nut to rotate with said lead screw.

3. A mechanical movement device comprising, a rotatable lead screw, a nut threadedly receiving said lead screw, a non-rotatable member, a braking member rotatably supported on said non-rotatable member, first braking means operatively secured to said braking member and grippingly engageable with said nut within predetermined torque limits to secure said nut to said braking member for simultaneous rotational movement therewith within said predetermined torque limits, and second braking means selectively operable independently of said first braking means to secure said braking member to said non-rotatable member whereby said first and second braking means cooperatively secure said nut against rotation for axial movement along said lead screw upon relative rotational movement therebetween.

4. A mechanical movement device comprising, a rotatable lead screw, a nut threadedly receiving said lead screw, a non-rotatable member, a braking member rotatably supported on said non-rotatable member, first braking means operatively secured to said braking member and grippingly engageable with said nut within predetermined torque limits to secure said nut to said braking member for simultaneous rotational movement therewith within said predetermined torque limits, second braking means selectively operable independently of said first braking means to secure said braking member to said non-rotatable member whereby said first and second braking means cooperatively secure said nut against rotation for axial movement along said lead screw upon relative rotational movement therebetween, and means on said lead screw engageable by said nut within predetermined limits of axial travel therealong to brake said nut to said lead screw and thereby apply a torque overload sufficient to disengage said first braking means and thereby allow said nut to rotate with said lead screw.

5. A mechanical movement device comprising a rotatable lead screw, a nut threadedly receiving said lead screw, a non-rotatable member, a braking member rotatably supported on said non-rotatable member, first braking means operatively secured to said braking member and grippingly engageable with said nut with a predetermined resilient friction force to secure said nut to said braking member for simultaneous rotational movement therewith within predetermined torque limits therebetween, and second braking means operable selectively and independently of said first braking means to brake said braking member to said non-rotatable member whereby said first and second braking means cooperatively secure said nut against rotation for axial movement thereof along said lead screw upon relative rotational movement therebetween.

6. A mechanical movement device comprising a rotatable lead screw, a nut threadedly receiving said lead screw, a non-rotatable member, a braking member rotatably supported on said non-rotatable member, first braking means operatively secured to said braking member and grippingly engageable with said nut with a predetermined resilient friction force to secure said nut to said braking member for simultaneous rotational movement therewith within predetermined torque limits therebetween, second braking means operable selectively and independently of said first braking means to brake said braking member to said non-rotatable member whereby said first and second braking means cooperatively secure said nut against rotation for axial movement thereof along said lead screw upon relative rotational movement therebetween, and means on said lead screw engageable by said nut within predetermined limits of axial travel therealong to brake said nut to said lead screw and thereby apply a torque overload sufficient to disengage said first braking means and thereby allow said nut to rotate with said lead screw.

7. A mechanical movement device comprising, a rotatable lead screw, a nut threadedly receiving said lead screw, a non-rotatable members, a braking member rotatably supported on said non-rotatable member, first braking means including spring means operatively secured to said braking member and resiliently gripping said nut with a predetermined frictional force to thereby secure said nut to said braking member for simultaneous rotational movement therewith within predetermined torque limits therebetween, and second braking means operatively interconnecting said non-rotatable member and said braking member to secure said braking member to said non-rotatable member whereby said first and second braking means cooperatively secure said nut against rotation for axial movement along said lead screw upon relative rotational movement therebetween.

8. A mechanical movement device comprising, a rotatable lead screw, a nut threadedly receiving said lead screw, a non-rotatable member, a braking member rotatably supported on said non-rotatable member, spring means operatively secured to said braking member and resiliently gripping said nut with a predetermined frictional force to thereby secure said nut to said braking member for simultaneous rotational movement therewith within predetermined torque limits therebetween, and power operated braking means operable selectively and independently of said spring means for operatively interconnecting said non-rotatable member and said braking member to secure said braking member to said non-rotatable member and thereby cooperatively secure said nut against rotation for axial movement along said lead screw upon relative rotational movement therebetween.

9. A mechanical movement device comprising, a rotatable lead screw, an annular nut threadedly receiving said lead screw, a non-rotatable housing having an annular opening for receiving said nut, means rotatably supporting said housing on said nut, an annular braking member rotatably supported within said opening of said housing in annular spaced relationship to said nut, first braking means positioned in the annular space between said braking member and nut in gripping engagement with said nut and operatively secured to said braking member to secure said nut to said braking member for simultaneous rotational movement therewith within predetermined torque limits, and second braking means mounted on said housing and operable selectively and independently of said first braking means to operatively interconnect said braking member and said housing to secure said braking member against rotation and thereby cooperate with said first braking means in securing said nut against rotation for axial movement along said lead screw upon relative rotational movement therebetween.

10. A mechanical movement device comprising, a helically threaded rotatable lead screw, an annular nut having a helically threaded bore threadedly receiving said lead screw, a non-rotatable housing having an annular opening therethrough for receiving said nut, anti-friction means rotatably supporting said housing on said nut, an annular braking ring rotatably supported on said housing in annular spaced relationship to said nut, a coil spring within said annular space in resilient gripping engagement with said nut and being operatively secured to said braking member to secure said nut to said braking member for simultaneous rotational movement therewith within predetermined torque limits, and power operated braking means operable selectively and independently of said spring to secure said braking member to said housing and thereby cooperate with said spring in securing said nut against rotation for axial movement along said lead screw upon relative rotational movement therebetween.

References Cited in the file of this patent

UNITED STATES PATENTS

| | | |
|---|---|---|
| 1,278,811 | Ragan | Aug. 27, 1918 |
| 2,602,664 | Matchett | July 8, 1952 |
| 2,633,923 | Hartz | Apr. 7, 1953 |
| 2,660,281 | Ochtman | Nov. 24, 1953 |

UNITED STATES PATENT OFFICE
CERTIFICATE OF CORRECTION

Patent No. 2,860,521                                                         November 18, 1958

George W. Sierant

It is hereby certified that error appears in the printed specification of the above numbered patent requiring correction and that the said Letters Patent should read as corrected below.

Column 1, line 54, for "The" read -- This --; column 2, lines 29 and 30, strike out "which receives a helically threaded bore 12"; column 5, line 10, for "relatively" read -- relative --; column 6, line 15, for "members" read -- member --; column 8, line 4, list of references cited, for the patent number "1,278,811" read -- 1,276,811 --.

Signed and sealed this 26th day of May 1959.

(SEAL)
Attest:

KARL H. AXLINE                                                       ROBERT C. WATSON
Attesting Officer                                              Commissioner of Patents